United States Patent [19]

Wessel

[11] 4,430,899
[45] Feb. 14, 1984

[54] FLUID PRESSURE SENSOR, PARTICULARLY DIESEL ENGINE INJECTION PUMP PRESSURE SENSOR

[75] Inventor: Wolf Wessel, Oberriexingen, Fed. Rep. of Germany

[73] Assignee: Robert Bosch GmbH, Stuttgart, Fed. Rep. of Germany

[21] Appl. No.: 374,403

[22] Filed: May 3, 1982

[30] Foreign Application Priority Data

Jun. 5, 1981 [DE] Fed. Rep. of Germany ....... 3122375

[51] Int. Cl.³ .......................... G01L 9/08; G01M 15/00
[52] U.S. Cl. .................................. 73/754; 73/119 A; 73/DIG. 4
[58] Field of Search .................. 73/754, 119 A, 761, 73/DIG. 4, 115; 411/395

[56] References Cited

U.S. PATENT DOCUMENTS

| | | | |
|---|---|---|---|
| 3,151,258 | 9/1964 | Sonderegger et al. | 73/761 |
| 3,835,523 | 9/1974 | Stansfield | 411/395 |
| 4,109,518 | 8/1978 | Dooley et al. | 73/119 A |

Primary Examiner—Donald O. Woodiel
Attorney, Agent, or Firm—Frishauf, Holtz, Goodman & Woodward

[57] ABSTRACT

To provide a high output signal, a strain bolt (12, 12a) is screwed (13, 13a) into a tapped bore extending through the housing wall (10), the bolt having a bore (14) extending therethrough, and a region or zone (18) of reduced outer diameter to form a comparatively thin-walled tubular or sleeve-like region which, upon application of fluid, typically liquid fuel pressure within the housing, tends to elongate the portion of the bolt of reduced wall thickness; a piezo-ceramic transducer assembly, preferably formed of two oppositely polarized disks (23, 24) is clamped between an integral head (FIG. 1: 19) or a separate clamping nut (FIG. 2: 31) and the outer wall of the housing, or an abutment surface formed by the upper surface of an intermediately positioned tightening nut (FIG. 2: 19a) so that, upon application of fluid pressure, and straining of the thin-walled portion (18) of the bolt, the bias pressure on the piezo-ceramic disks (23, 24) changes, thus providing an output signal available from a central terminal (25a).

9 Claims, 2 Drawing Figures

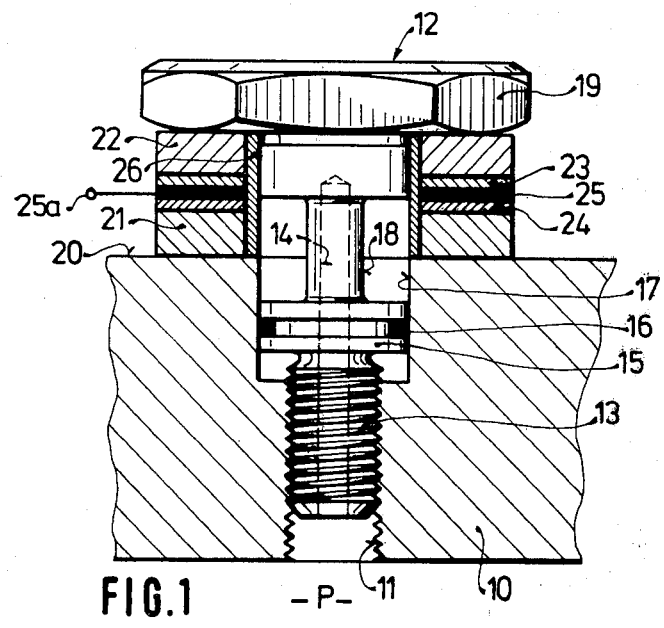
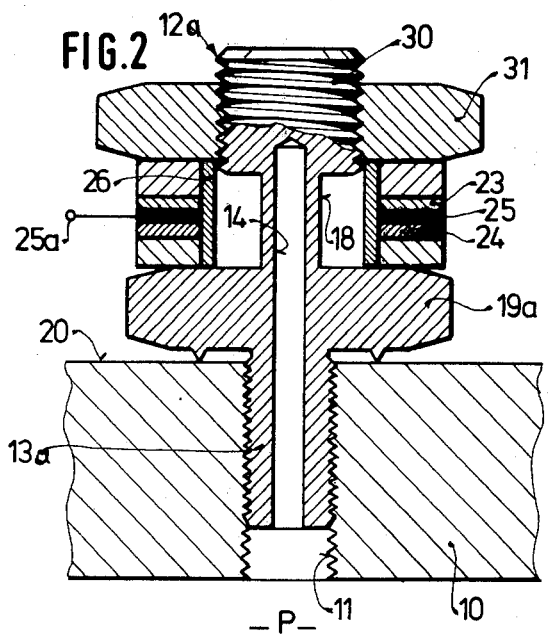

FLUID PRESSURE SENSOR, PARTICULARLY DIESEL ENGINE INJECTION PUMP PRESSURE SENSOR

The present invention relates to a fluid pressure sensor, and more particularly to a device to sense hydraulic pressure, especially the hydraulic pressure within a Diesel engine fuel injection pump chamber.

BACKGROUND

Various types of fluid pressure devices are known in which a pressure P within a chamber can be determined. One type of apparatus utilizes a sensor which can be elastically deformed, in which the elastic deformation or strain is sensed, the sensor being coupled to a pressure-sensitive device which provides an electrical output signal responsive to pressure exerted thereon. The strain-type element changes its dimension, and a previously existing bias pressure on the pressure transducer element changes, thus providing an output signal representative of pressure within the chamber.

A sensor suitable for sensing fluid pressure within a chamber, for example hydraulic pressure within a pump chamber, is described in U.S. Pat. No. 4,109,518, Dooley et al. This sensor is suitable for determining the hydraulic pressure available to inject fuel through the injection valve of a Diesel engine. The structure described includes a bolt which is screwed into the cylinder head of the internal combustion engine and which has a washer thereon, retaining a pressure-sensitive element in form of a piezo-ceramic disk, is secured to the cylinder head by means of a nut. The arrangement provides output signals which, however, are relatively small since the elastic deformation of the bolt or screw, which has a relatively large diameter, does not contribute to the deformation of the piezo-ceramic disk, and hence detracts from the signal amplitude.

THE INVENTION

It is an object to provide a fluid pressure transducer which furnishes output signals of increased amplitude with respect to those available from prior art structures, which is simple, and which is readily adapted for use in and combination with Diesel engine fuel injection pumps.

Briefly, a bolt is screwed into an opening through the wall of the housing within which the fluid chamber is defined. The bolt has the one end which is screwed in the housing fixed thereto. The other end of the bolt has a head, either integral or as a separate element, attached thereto, the head clamping a pressure-sensitive transducer element, typically a piezo-electric ceramic disk, between the head and a fixed abutment, typically the outer surface of the wall of the housing. The bolt acts as a strain element and, in order to provide elongation thereof under the influence of fluid pressure within the chamber, the bolt is formed with a region which is elastically deformable upon application of the fluid pressure to that deformable region. The deformable region has a cross section which is substantially less than that of the portion of the bolt screwed in the housing, so that the overall cross section of the bolt or of the head will not detract from the amplitude of the output signal. In a preferred form of the invention, the bolt is formed with a bore extending therethrough into the zone of reduced cross section, the outer dimension of the zone and of the bore being matched to leave a thin-walled sleeve-like or tube-like portion which can elongate upon application of fluid pressure through the bore, pushing the head of the bolt outwardly, and thus changing pressure being applied to the piezo-electric disk being clamped between the head of the bolt and the counter surface.

The system has the advantage that the signal amplitude derived from the pressure-sensitive element, typically a piezo-electric transducer, is increased. The elastic deformation of the zone of reduced diameter of the bolt permits sufficient change in dimension thereof upon application of pressure to increase the output signal amplitude for a given pressure within the chamber.

The bolt, formed as a strain element, is preferably screwed into a tapped hole extending through the wall of the housing. The bolt may be formed with a piston-like section, in which an O-ring is seated, to prevent leakage of pressurized fluid from the interior of the housing. In accordance with another form of the invention, the piezo-ceramic disk, as well as the elastically deformable section of the strain bolt, is located above a head element secured to the bolt, the piezo-ceramic disk being retained by a nut which is screwed on the bolt beyond the elastically deformable zone. This arrangement readily permits exchange of the piezo-ceramic disk, for example in case of malfunction or breakage, and to calibrate the output signal from the piezo-ceramic disk independently of the seating of the bolt in the tapped bore extending through the wall of the housing within which the pressure chamber is defined.

DRAWINGS

FIG. 1 is a part-sectional view through the sensing element in accordance with the first embodiment of the invention; and FIG. 2 is a longitudinal sectional view through the pressure sensing element in accordance with the second embodiment.

A housing 10, shown only in fragmentary form, is the housing of a Diesel engine fuel injection pump, within which a fuel injection pressure P will arise when fuel is to be injected into the cylinder of the Diesel engine. It is the purpose of the pressure sensor to measure this pressure, which varies as the pump supplies fuel injection pulses to pressurize the fuel for injection into the cylinder of the Diesel engine. The wall 10 is formed with a bore 11 which is tapped. A strain bolt 12, formed with a tapped inner end portion 13, is screwed into the tapped bore 11. The bolt 12 is formed with an axial bore 14, extending longitudinally through the bolt. The bore 12 is extended at the side facing the outer surface 20 of the housing by an extended region 17. The bore 17 has smooth walls and, as clearly seen in FIG. 1, has a diameter which is larger than that of the tapped bore 11. A piston-like disk element or thickened region 15 is secured to the stem of the bolt 12. The outer surface of the disk 15 is formed with a groove which retains a sealing O-ring 16 therein. The sealing ring 16 prevents escape of pressurized fluid from the region within the chamber defined by the wall 10, past the threads on the bolt to the outside.

The stem of the bolt beyond the disk or thickened portion 15 is formed by a section or zone 18. The section or zone 18 has an outer diameter which is reduced with respect to the diameter of the threaded portion 13. The bore 14 extends into the zone 18. The wall thickness of the zone 18 is so dimensioned that it is elastically deformable in accordance with a predetermined pressure-deformation relationship. Fluid pressure P from the interior of the chamber is passed through the bore 14 into the zone 18. The zone 18 merges in a screw head 19. A pressure-sensitive transducer element is clamped between the screw head 19 and the outer surface 20 of the wall 10 of the housing. The pressure transducer element is a composite made of two steel washers 21, 22, two piezo-ceramic disks 23, 24, which are oppositely polarized, and a contact layer or contact disk 25 which is connected to a terminal 25a. The entire assembly is insulated by an electrical sleeve 26 towards the inside opening.

Operation: The transducer assembly, formed by the steel disks 21, 22, the piezo-electric disks 23, 24, contact disk or layer 25, and insulating sleeve 26, is assembled over the bolt 12. The bolt 12 is then screwed into the tapped bore 11. Upon tightening of the head 19, a bias pressure will be applied by the head 19 against the piezo-disks 23, 24.

Upon application of a pressure P within the interior of the housing, the zone 18 will be elastically deformed, for example will elongate, thus reducing the pressure on the piezo-ceramic disks 23, 24. Change in pressure on the disks 23, 24 can be sensed, as well known, in the form of an electrical signal at terminal 25a.

In the example shown, two piezo-ceramic disks 23, 24 are used, oppositely polarized. Of course, a single piezo-electric disk may also be used, or some other pressure-sensitive element may be assembled to be clamped between the abutment surface formed by the outer surface 20 of the housing and the head 19 of the screw 12. The insulating sleeve 26, in the embodiment of FIG. 1, insulates the disks 23, 24 towards one side, so that a pressure-sensitive signal can be derived from the clamp 25a with respect to ground or chassis potential connected, for example, to the housing 10 which, typically, is made of steel.

The disk-like or thickened region 15, forming a piston, with the O-ring 16 therein, reliably seals the pressure medium within the chamber against leakage to the outside.

Embodiment of FIG. 2: A bolt 12a having an inner end portion 13a is screwed in the bore 11 extending through the wall 10 of the housing, within which the fluid pressure is generated. The head 19a of the bolt 12a is not, however, located at the end portion of the bolt but, rather, is attached directly to the inner threaded portion 13a. The head 19a preferably is formed with sealing projections, as well known, to prevent escape of pressurized fluid from the interior of the chamber defined by the wall 10. This arrangement permits securing the strain bolt 12a directly in the bore 11 without considering a required bias pressure on the ceramic disks 23, 24 and thus to provide a tight screw-in seal. The elastically deformable zone 18 is located in the bolt extension upwardly of the head 19a, and is extended upwardly to form an outwardly threaded bolt head 30. A nut 31 can be screwed on the head 30. The transducer assembly 21-26, which can be identical to the arrangement described in connection with FIG. 1, is secured between the nut 31 and the upper surface of the bolt head 19a.

The arrangement in accordance with FIG. 2 has the advantage that the nut 31 can be tightened on the head 30 to provide a bias pressure on the piezo-ceramic disks independently of attachment of the sensor arrangement in the wall 10.

Operation: Upon occurrence of a pressure P, the elastic zone 18 is strained, so that nut 31 will move slightly outwardly, thus decreasing the bias pressure exerted on the ceramic disks 23, 24, to permit obtaining an electrical signal representative of and preferably directly proportional to change in pressure on the disks 23, 24 from terminal 25a, similar to the signal derived from terminal 25a in the sensor of FIG. 1.

The sensor arrangement is particularly suitable for measuring high pressures, for example the pressure within a Diesel engine fuel injection pump. The wall 10 as shown in FIGS. 1 and 2 then will be a portion of the housing of the fuel injection pump.

Various changes and modifications may be made, and features described in connection with any one of the embodiments may be used with any other, within the scope of the inventive concept.

I claim:

1. Fluid pressure sensor, particularly for high fluid pressures (P) in a chamber within a housing (10) having
    a bolt (12, 12a) secured in a wall of the housing, said bolt (12, 12a) being formed with a bore (14) which communicates with said chamber so that fluid, under pressure, in said chamber will penetrate into the bore;
    and a pressure-sensitive element (21-26) providing an output signal representative of the pressure of the fluid
    wherein
    the bolt has one end (13, 13a) thereof secured in fixed position in the wall of the housing;
    means (19, 30, 31) are provided clamping the pressure-sensitive element between the wall of the housing and the other end of the bolt;
    and said bolt has a region (18) which is elasticallly deformable upon application of said fluid pressure (P), which region is positioned between both said ends,
    the outer diameter of the bolt being reduced in said region (18) to leave a thin-walled section of the bolt permitting deformation thereof under application of fluid pressure, and thus provide for reduction of clamping pressure on the pressure-sensitive element to provide said output signal representative of pressure in the chamber.

2. Sensor according to claim 1, wherein the pressure-sensitive element comprises at least one piezo-ceramic disk (23, 24) positioned beneath said clamping means.

3. Sensor according to claim 2, wherein two piezo-ceramic disks (23, 24) are provided, polarized in opposite direction.

4. Sensor according to claim 1, wherein said clamping means comprises a bolt head (19) forming part of said bolt and being positioned adjacent said region remote from said first end, said region (18) of lesser cross-sectional area merging into said bolt head;
    and wherein the pressure-sensitive element (21-26) comprises a piezo-ceramic disk structure (23, 24) positioned between the outer surface (20) of the wall of said housing (10) and the facing surface of the bolt head.

5. Sensor according to claim 4, wherein the housing (10) is formed with a tapped bore (11), and said one end (13) of the bolt is threaded into said tapped bore;
    said bore further being formed with a smooth-walled portion (17) of enlarged diameter, and a piston-like diametrical extension is formed on the bolt (12), sealingly fitted in said smooth-walled bore portion (17) of enlarged diameter.

6. Sensor according to claim 1, wherein the housing is formed with a tapped bore (11);

said one end (13a) of the bolt being threaded and secured in said tapped bore;

said bolt being formed with a bolt head intermediate its length, and positioned beyond said threaded portion (13a) to provide for tight sealing engagement of the bolt head against the outer surface (20) of the housing (10) upon threaded engagement of said one end of the bolt in the tapped bore;

said region (18) of the bolt extending beyond the bolt head and terminating in a threaded end portion (30);

and wherein said means for clamping the pressure-sensitive element comprises a nut (31) fitted on said threaded end (30).

7. Sensor according to claim 6, wherein said pressure-sensitive element comprises a piezo-ceramic disk structure (23, 24) positioned between the upper surface of said bolt head (19a) and the facing surface of said nut (31).

8. In a Diesel engine fuel injection pump, a housing wall (10) formed with a threaded bore (11) therein, and fluid pressure sensing means secured in said threaded bore, said fluid pressure sensing means comprising the fluid pressure sensor as claimed in claim 1, wherein said one end (13, 13a) of the bolt is threaded and threadedly engaged with the threaded bore (11) of the housing.

9. The fuel injection pump of claim 8, wherein said pressure-sensitive element comprises a piezo-electric disk structure (21–26) including a pair of oppositely polarized piezo-electric disks formed with a central opening surrounding said bolt, and means (26) insulating the outer surfaces of the bolt with respect to the facing surfaces of said piezo-electric disks.

* * * * *